United States Patent
Kang et al.

(10) Patent No.: US 9,447,577 B2
(45) Date of Patent: Sep. 20, 2016

(54) SOUND ABSORBING SHEET HAVING MICRO RESONANT STRUCTURE, METHOD FOR MANUFACTURING SAME, AND SOUND ABSORPTION TYPE SOUNDPROOF PANEL USING SAME

(71) Applicant: LG Hausys, Ltd., Seoul (KR)

(72) Inventors: Gil Ho Kang, Gunpo-si (KR); Seong Moon Jung, Daejeon (KR); Bong Gyu Kang, Seoul (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 14/649,009

(22) PCT Filed: Nov. 26, 2013

(86) PCT No.: PCT/KR2013/010763
§ 371 (c)(1),
(2) Date: Jun. 2, 2015

(87) PCT Pub. No.: WO2014/088251
PCT Pub. Date: Jun. 12, 2014

(65) Prior Publication Data
US 2015/0315781 A1 Nov. 5, 2015

(30) Foreign Application Priority Data

Dec. 6, 2012 (KR) .................. 10-2012-0141335

(51) Int. Cl.
*E04B 1/84* (2006.01)
*B29C 59/02* (2006.01)
(Continued)

(52) U.S. Cl.
CPC ............. *E04B 1/84* (2013.01); *B29C 59/022* (2013.01); *B29C 59/04* (2013.01); *G10K 11/172* (2013.01);
(Continued)

(58) Field of Classification Search
CPC .................... B29C 59/022; E04B 2001/8414
USPC ....... 181/284, 286, 288, 293, 290, 294, 295, 181/296
See application file for complete search history.

(56) References Cited

U.S. PATENT DOCUMENTS

| 4,073,991 A | 2/1978 | Focht |
| 4,097,633 A * | 6/1978 | Focht ..................... B32B 27/00 156/209 |

(Continued)

FOREIGN PATENT DOCUMENTS

| EP | 1761914 A1 | 1/2006 |
| JP | 03182342 A | 8/1991 |

(Continued)

OTHER PUBLICATIONS

International Search Report for PCT/KR2013/010763 mailed on Mar. 4, 2014, citing the above reference(s).

(Continued)

*Primary Examiner* — Jeremy Luks
(74) *Attorney, Agent, or Firm* — Hauptman Ham, LLP (57) ABSTRACT

Disclosed are a sound absorbing sheet having a micro resonant structure and capable of improving sound absorption performance up to the low frequency band by means of the micro resonance principle, a method for manufacturing same, and a sound absorption type soundproof panel using same. The sound absorbing sheet according to the present invention has multiple uneven patterns configured to have convex parts and concave parts on one surface of a porous base material, and the area ratio of the concave part determined by the following formula 1 is 40 to 99%. The area corresponding to the concave part has a lower air permeability than the area corresponding to the convex part.

Area ratio of concave portion=[area portion of concave portion]/[area portion of porous base material]. [Formula 1]

16 Claims, 7 Drawing Sheets

(51) Int. Cl.
  *B29C 59/04* (2006.01)
  *G10K 11/172* (2006.01)
  *B29K 67/00* (2006.01)
  *B29K 105/04* (2006.01)
  *B29K 105/08* (2006.01)

(52) U.S. Cl.
  CPC ...... *B29K 2067/003* (2013.01); *B29K 2105/04* (2013.01); *B29K 2105/0854* (2013.01); *B29K 2995/002* (2013.01)

(56) References Cited

U.S. PATENT DOCUMENTS

| | | | | |
|---|---|---|---|---|
| 4,213,516 | A * | 7/1980 | Sulewsky | E04B 1/8409 181/286 |
| 4,493,471 | A * | 1/1985 | McInnis | F16F 1/376 181/208 |
| 4,867,271 | A * | 9/1989 | Tschudin-Mahrer | G10K 11/168 181/286 |
| 2003/0066708 | A1 * | 4/2003 | Allison | B32B 5/18 181/290 |

FOREIGN PATENT DOCUMENTS

| | | |
|---|---|---|
| JP | 0760890 A | 3/1995 |
| JP | 08087277 A | 4/1996 |
| JP | 2000075865 A | 3/2000 |
| JP | 2006337886 A | 12/2006 |
| JP | 2007230130 A | 9/2007 |
| JP | 2009149117 A | 7/2009 |
| KR | 200379075 Y1 | 3/2005 |
| KR | 20070033453 A | 3/2007 |
| KR | 20110004418 A | 1/2011 |
| KR | 20110076895 A | 7/2011 |

OTHER PUBLICATIONS

Extended European Search Report dated Jan. 20, 2016 in connection with the counterpart European Patent Application No. 13860957.3, citing the above reference(s).

Korean Notice of Allowance dated Mar. 11, 2016 in connection with the counterpart Korean Patent Application No. 10-2012-0141335, citing the above reference(s).

* cited by examiner

SOUND ABSORBING SHEET HAVING MICRO RESONANT STRUCTURE, METHOD FOR MANUFACTURING SAME, AND SOUND ABSORPTION TYPE SOUNDPROOF PANEL USING SAME

CROSS REFERENCE TO RELATED APPLICATION

This application claims the priority of Korean Patent Application No. 10-2012-0141335 filed on Dec. 6, 2012 in the Korean Patent and Trademark Office. Further, this application is the National Phase application of International Application No. PCT/KR2013/010763 filed on Nov. 26, 2013, which is incorporated herein by reference in its entirety.

TECHNICAL FIELD

The present invention relates to a sound absorbing sheet, and more particularly, to a sound absorbing sheet, which includes a micro resonant structure and can exhibit improved sound absorption capabilities in a low frequency band, a method for manufacturing the same, and a sound absorption type soundproof panel using the same.

BACKGROUND ART

Various kinds of sound absorbers are used in various industries including automobiles, aircraft, buildings and the like in order to absorb sounds. The sound absorbers protect against undesired or harmful sounds based on an undesired frequency region in a given environment.

In particular, although porous materials are unsuitable for absorbing low frequency sounds, the porous materials are used for absorption of high frequency sounds due to demand for a considerable material thickness.

Among porous materials, for example, non-woven fabrics are produced by melt-blowing. Sound absorption capabilities of the non-woven fabrics are attributed to a porous sound absorption principle formed by micro fibers constituting the non-woven fabrics. However, porous sound absorption is advantageous in sound absorption in a high frequency band, but has a drawback of poor sound absorption in mid and low frequency bands. Thus, there is need for non-woven fabrics capable of providing good sound absorption capabilities even in mid and low frequency bands.

In the related art, Korean Patent Publication No. 2011-4418 A (publication date: Jan. 13, 2011) discloses a multi-layer sound absorbing sheet, which includes a film layer having fine through-bores and openings and a fibrous material layer disposed on the film layer and thus has an improved coefficient of sound absorption in a frequency band of 1000 Hz or more.

DISCLOSURE

Technical Problem

It is an aspect of the present invention to provide a sound absorbing sheet which includes a resonant structure and thus can exhibit improved sound absorption capabilities in a low frequency band by a principle of micro resonance.

It is another aspect of the present invention to provide a method for manufacturing a sound absorbing sheet, which can exhibit improved sound absorption capabilities in a low frequency band, such that the sound absorbing sheet has a resonant structure in the process of manufacture thereof.

It is a further aspect of the present invention to provide a sound absorption type soundproof panel capable of exhibiting improved sound absorption capabilities in a low frequency band using the sound absorbing sheet as set forth above.

Technical Solution

In accordance with one aspect of the present invention, a sound absorbing sheet includes a large number of convex-concave patterns, which include protrusions and depressions, on one surface of a porous substrate, wherein the sound absorbing sheet has an area ratio of the depressions from 40% to 99%, as represented by Equation 1, and a region corresponding to the depressions exhibits lower air permeability than a region corresponding to the protrusions.

$$\text{Area ratio of depressions} = [\text{Area of depressions}] / [\text{Area of porous substrate}]. \quad \text{[Equation 1]}$$

In accordance with another aspect of the present invention, a method for manufacturing a sound absorbing sheet includes: preparing a porous substrate; and forming convex-concave patterns having protrusions and depressions on one surface of the porous substrate through thermal transfer.

In accordance with a further aspect of the present invention, a sound absorption type soundproof panel includes: a sound absorber; and a sound absorbing sheet formed on at least one surface of the sound absorber, wherein the sound absorbing sheet includes a large number of convex-concave patterns including protrusions and depressions on one surface of a porous substrate and has an area ratio of the depressions from 40% to 99%, as represented by Equation 1, and a region corresponding to the depressions exhibits lower air permeability than a region corresponding to the protrusions.

Advantageous Effects

According to the present invention, the sound absorbing sheet includes a micro resonant structure on the porous substrate and thus can exhibit improved sound absorption capabilities even in mid and low frequency bands from 200 Hz to 2000 Hz by a principle of micro resonance.

According to the present invention, the sound absorption type soundproof panel includes the sound absorbing sheet as set forth above and thus can exhibit improved sound absorption capabilities in mid and low frequency bands from 200 Hz to 2000 Hz.

According to the present invention, the sound absorbing sheet capable of exhibiting improved sound absorption capabilities in mid and low frequency bands can be easily manufactured by a simple method of forming a resonant structure on the substrate in the process of manufacturing the sound absorbing sheet.

BEST MODE

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof. Like components will be denoted by like reference numerals throughout the specification.

Hereinafter, a sound absorbing sheet, a method for manufacturing the sound absorbing sheet, and a sound absorption type soundproof panel using the sound absorbing sheet according to embodiments of the present invention will be described in detail with reference to the accompanying drawings.

Figure 1:
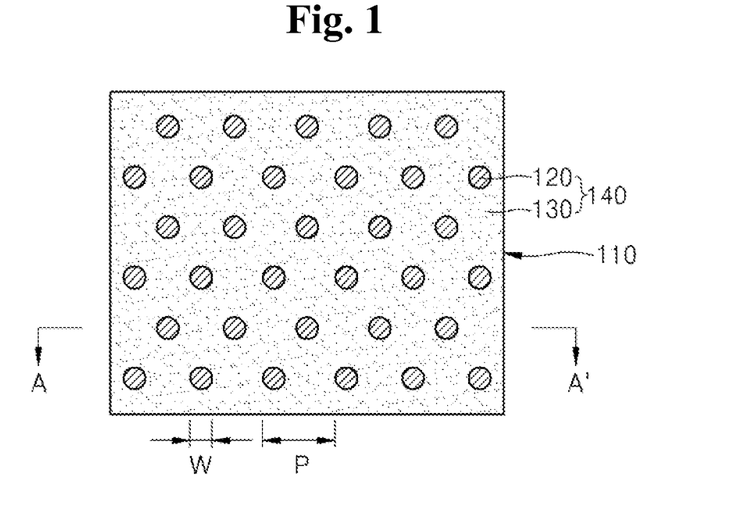
FIG. 1 is a plan view of a sound absorbing sheet according to one embodiment of the present invention.
Figure 2:
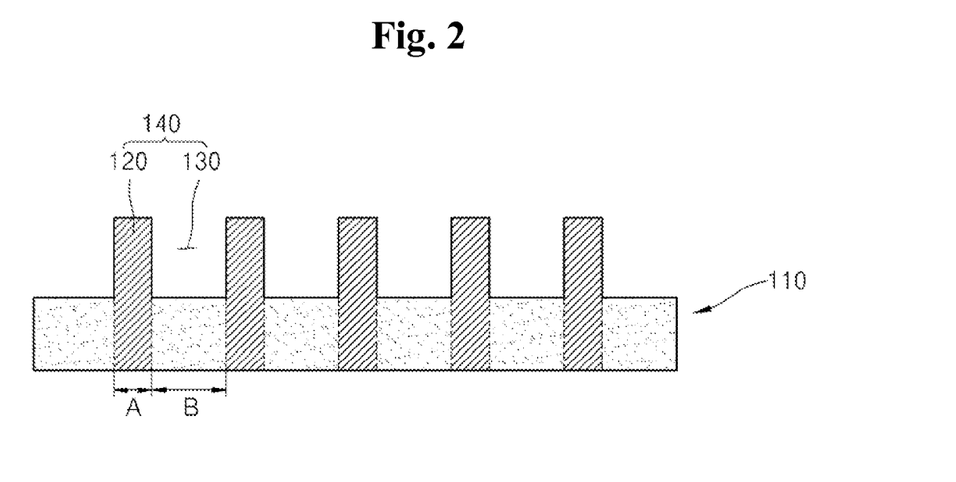
FIG. 2 is a sectional view taken along a line A-A' of FIG. 1.

FIG. 1 is a plan view of a sound absorbing sheet according to one embodiment of the present invention and FIG. 2 is a sectional view taken along a line A-A' of FIG. 1.

Referring to FIGS. 1 and 2, the sound absorbing sheet according to the embodiment of the present invention includes a porous substrate 110 which includes convex-concave patterns 140 including protrusions 120 and depressions 130 on one surface of the substrate.

According to the present invention, the porous substrate 110 is a sound absorbing material having a capability of absorbing sounds, and may be thermoplastic organic fibers or thermoplastic organic fibers containing partial inorganic fibers. Here, the thermoplastic organic fibers may include, for example, at least one selected from among polyethylene terephthalate (PET), polyethylene (PE), and polypropylene (PP).

The porous substrate 110 may have a basis weight of 30 g/m² to 800 g/m². Here, if the basis weight of the porous substrate 110 is less than 30 g/m², there is difficulty in forming a resonant layer since there is a high possibility of air permeation upon formation of the depressions due to too low fiber density. On the other hand, if the basis weight of the porous substrate 110 is greater than 800 g/m², it might not be easy to form the depressions since the porous substrate is too thick.

The porous substrate 110 may have a thickness of 0.1 mm to 10 mm. Here, if the thickness of the porous substrate 110 is less than 0.1 mm, it can be difficult to form the convex-concave patterns on the one surface of the porous substrate. On the other hand, if the thickness of the porous substrate 110 is greater than 10 mm, manufacturing costs are increased without any improvement in sound absorption capabilities. Here, the thickness of the porous substrate 110 refers to a distance from a bottom surface to a top surface.

The porous substrate 110 may have an initial air permeability of 20 L/m²/s to 1200 L/m²/s at 100 Pa, and may have an air permeability of 20 L/m²/s to 1200 L/m²/s at 200 Pa after formation of the convex-concave patterns 140. If the initial air permeability of the porous substrate 110 or the air permeability thereof after formation of the convex-concave patterns 140 is out of the range as set forth above, the porous substrate 110 can exhibit deteriorated sound absorption capabilities since the air permeability is too high or low.

According to the present invention, the sound absorbing sheet may include a first air permeating portion A, which is a region corresponding to a large number of protrusions 120, and a second air permeating portion B, which is a region corresponding to the depressions 130 and exhibits lower air permeability than the first air permeating portion A.

The first air permeating portion A, which is the region corresponding to the protrusions 120, exhibits air permeability unique to the porous substrate 110 due to porosity of the porous substrate 110.

The depressions 130 of the convex-concave patterns 140 may be formed by thermal pressing using thermal transfer. In this case, since the second air permeating portion B corresponding to the depressions 130 partially loses air permeability of the porous substrate 110 due to thermal pressing, the second air permeating portion B can exhibit lower air permeability than the first air permeating portion A. Substantially, the second air permeating portion B corresponding to the depressions 130 can exhibit air impermeability, which means almost no air permeability. Here, the first air permeating portion A is formed in a micro resonant structure.

The micro resonant structure is a structure based on a resonance principle, and provides micro resonance to the sound absorbing sheet and thus contributes to absorbing mid and low frequencies from 200 Hz to 2000 Hz by a micro resonance principle. That is, the micro resonant structure serves to improve sound absorption capabilities in mid and low frequency bands from 200 Hz to 2000 Hz in the sound absorbing sheet. As a result, the sound absorbing sheet according to the present invention satisfies an average coefficient of sound absorption of 0.4 or more in the mid and low frequency bands as set forth above.

In particular, to satisfy sound absorption capabilities in mid and low frequency bands by the micro resonant structure, the sound absorbing sheet according to the present invention may have an area ratio of the depressions 130 of at least 40% or more, preferably 40% to 99%, in the porous substrate 110, as represented by Equation 1. Here, if the area ratio of the depressions 130 is less than 40%, the sound absorbing sheet can exhibit deteriorated sound absorption capabilities in mid and low frequency bands since an effect of resonant sound absorption is not properly exhibited. On the other hand, if the area ratio of the depressions 130 is greater than 99%, although the sound absorbing sheet exhibits an effect of resonant sound absorption, since a sound absorption frequency band becomes extremely narrow, an overall coefficient of sound absorption can be reduced.

Area ratio of depressions=[Area of depressions]/ [Area of porous substrate]   [Equation 1]

In addition, the protrusions 120 have a diameter W of 0.2 mm to 20 mm, preferably 0.5 mm to 5 mm. The protrusions 120 may have a circular shape as shown in FIG. 1.

Further, the convex-concave patterns 140 have a pitch P of 0.5 mm to 50 mm, preferably 0.5 mm to 20 mm. Here, if the diameter W of the protrusions 120 is less than 0.2 mm or greater than 20 mm, it is difficult for the sound absorbing sheet to have an effect of resonant sound absorption. Furthermore, if the pitch P of the convex-concave patterns 140 is less than 0.5 mm or greater than 50 mm, it can be difficult for the sound absorbing sheet to have an effect of resonant sound absorption.

Figure 3:
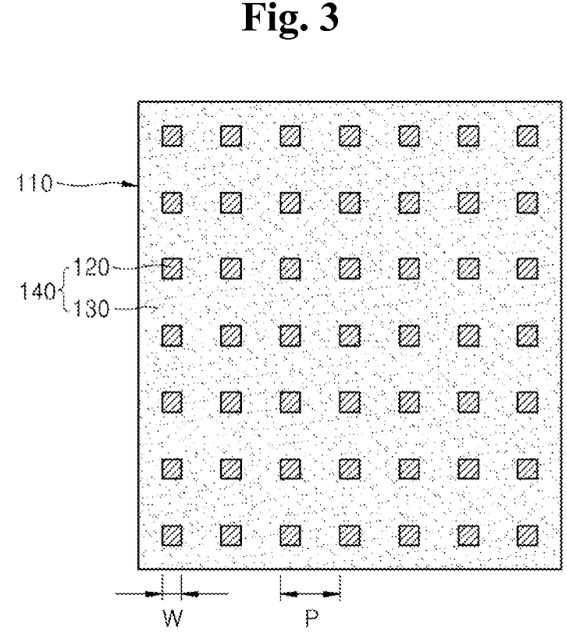
FIGS. 3 to 5 are plan views of other examples of a micro resonant structure formed in the sound absorbing sheet according to the embodiment of the present invention.
Figure 4:
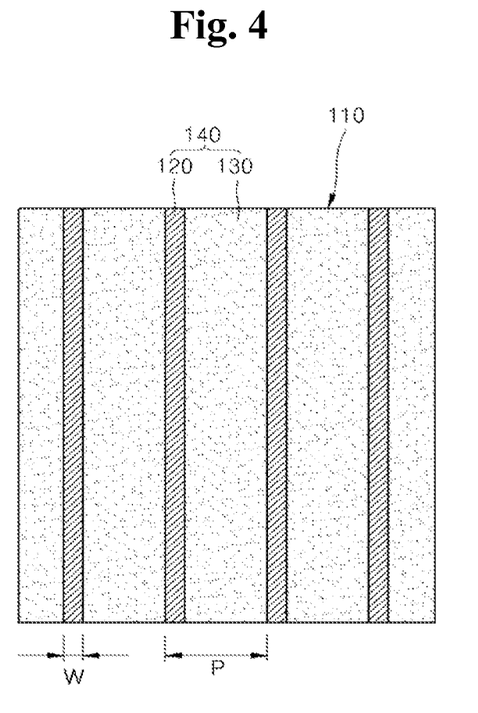
Figure 5:
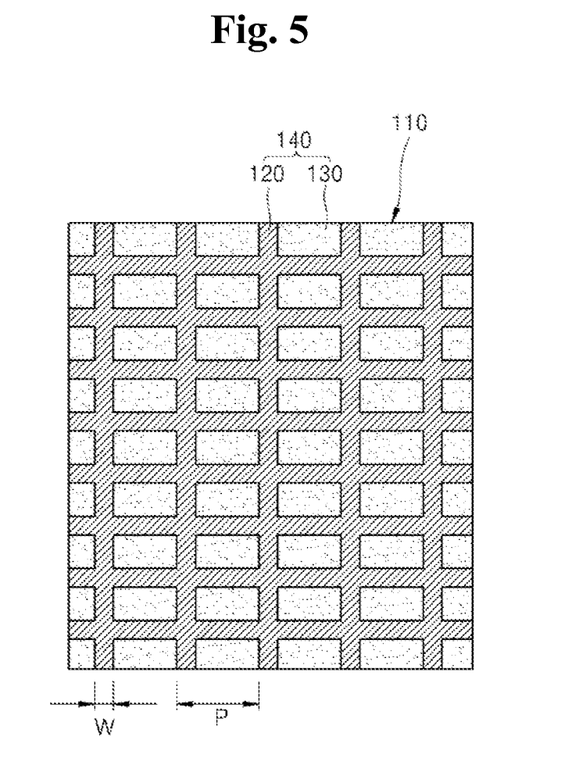

FIGS. 3 to 5 are plan views of other examples of the micro resonant structure formed in the sound absorbing sheet according to the embodiment of the present invention.

Referring to FIGS. 3 to 5, although the protrusions 120 formed on the porous substrate 110 of the illustrated sound absorbing sheet may have a polygonal shape, for example, a quadrangular shape as shown in FIG. 3, the protrusions 120 may have various shapes such as triangles, pentagons, and the like. Alternatively, the protrusions 120 of the sound absorbing sheet may have a stripe shape as shown in FIG. 4 or a shape selected from among combinations of shapes, as shown in FIGS. 2 to 5, for example, a check shape, as shown in FIG. 5.

The sound absorbing sheet according to the present invention may be formed in micro resonant structures of various shapes by the protrusions 120, as shown in FIGS. 3 to 5.

Here, the protrusions 120 have a width W of 0.2 mm to 20 mm, preferably 0.5 mm to 5 mm for the same reason as set forth above. In addition, the convex-concave patterns 140 have a pitch P of 0.5 mm to 50 mm, preferably 0.5 mm to 20 mm.

In FIGS. 3 to 5, reference numeral 130 refers to the depressions and the reference numeral 140 refers to the convex-concave patterns. Since these are the same as in FIG. 1, repeated descriptions thereof are omitted.

Next, a method for manufacturing a sound absorbing sheet according to one embodiment of the present invention will be described in brief.

According to the present invention, the method for manufacturing a sound absorbing sheet includes: preparing a porous substrate; and forming a large number of convex-concave patterns having protrusions and depressions on one surface of the porous substrate.

In preparation of the porous substrate, as described above, thermoplastic organic fibers or thermoplastic organic fibers containing partial inorganic fibers are prepared. The thermoplastic organic fibers may include, for example, at least one selected from among polyethylene terephthalate (PET), polyethylene (PE), and polypropylene (PP). The reason being that, when the thermoplastic organic fibers are heated to around the melting point thereof, thermoforming is facilitated.

Here, as described above, the porous substrate may have: a basis weight of 30 g/m$^2$ to 800 g/m$^2$; an original air permeability of 20 L/m$^2$/s to 1200 L/m$^2$/s at 100 Pa; and a thickness of 0.1 mm to 10 mm.

The porous substrate may be manufactured by applying typical dry process, wet process, spunbonding process, needle punching process, melt-blowing process or the like to the fibers as set forth above.

In forming the convex-concave patterns, a large number of convex-concave patterns including the protrusions and the depressions may be formed on the one surface of the porous substrate through thermal transfer.

When the porous substrate formed of the thermoplastic organic fibers, such as PET, PE, PP and the like, as set forth above is heated to around the melting point of the organic fibers, the organic fibers can be subjected to thermoforming. Using such thermoforming properties of the organic fibers, a micro resonant structure can be formed on the porous substrate itself.

According to the present invention, thermal transfer may be used as a molding method of the organic fibers. Thermal transfer may be achieved by embossed roll molding or embossed press molding, without being limited thereto. Among these methods, an example of embossed roll molding is illustrated in FIG. 6.

Figure 6:
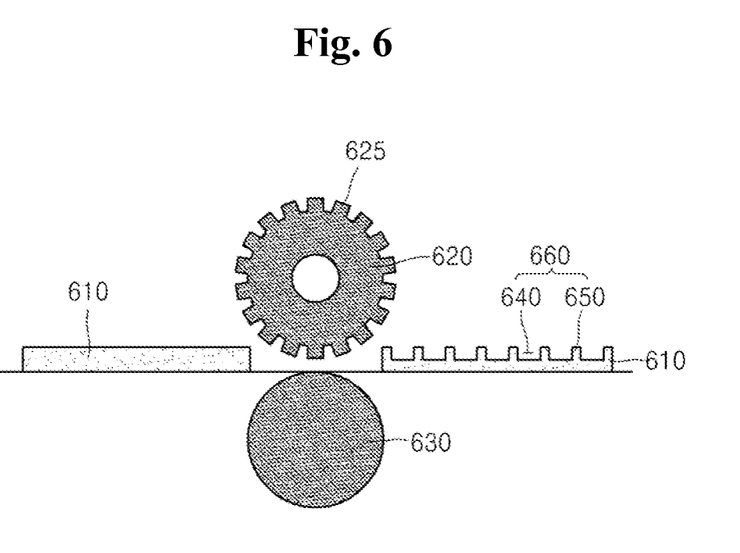
FIG. 6 is a schematic diagram of a process of forming a micro resonant structure on a porous substrate through embossed roll molding.

FIG. 6 is a schematic diagram of a process of forming a micro resonant structure on a porous substrate through embossed roll molding.

Referring to FIG. 6, a prepared porous substrate 610 is passed between an embossed roll, on which a large number of embossing protrusions 625 is formed, and a cylindrical roll 630 in a molding machine.

Here, the embossing protrusions 625 are transferred to one surface (shown as an upper surface) of the porous substrate 610 by the embossed roll 620, followed by curing, thereby forming a large number of convex-concave patterns 660 including depressions 640 and protrusions 650.

A process for forming a large number of convex-concave patterns 660 may be performed by preheating the porous substrate 610 to a temperature of 60% to 100% of a melting point thereof using an infrared (IR) heater or the like, followed by pressing the embossed roll 620 of a resonant structure shape onto the preheated porous substrate 610.

Thus, the embossing protrusions 625 of the embossed roll 620 are transferred to the one surface of the porous substrate 610, thereby forming a micro resonant layer including a large number of convex-concave patterns 660 having the depressions 640 and the protrusions 650.

Here, portions pressed by the embossed roll 620, that is, the depressions 640, exhibit reduced air permeability or no air permeability in severe cases, and portions not pressed by the embossed roll 620, that is, the protrusions 650, maintain air permeability unique to non-woven fabrics.

Here, when the porous substrate 610 is preheated to a temperature of less than 60% or greater than 100% the melting point thereof, since the substrate is not sufficiently melted or is too melted, it can be difficult to transfer the embossing protrusions.

In particular, in the process of forming a large number of convex-concave patterns 660, in order to satisfy sound absorption capabilities in mid and low frequency bands, the porous substrate 610 may be pressed such that an area ratio of the depressions 610, as defined as a ratio of the area of the depressions 640 to the area of the porous substrate 610, is 40% or more, preferably 40% to 99%.

The sound absorbing sheet according to the present invention may be applied to soundproof panels having sound absorption capabilities so as to suppress indoor noises by absorbing various noises generated indoors. The soundproof panels are variously used for building interior materials. Next, a soundproof panel using the sound absorbing sheet according to one embodiment of the present invention will be described in brief.

Figure 7:
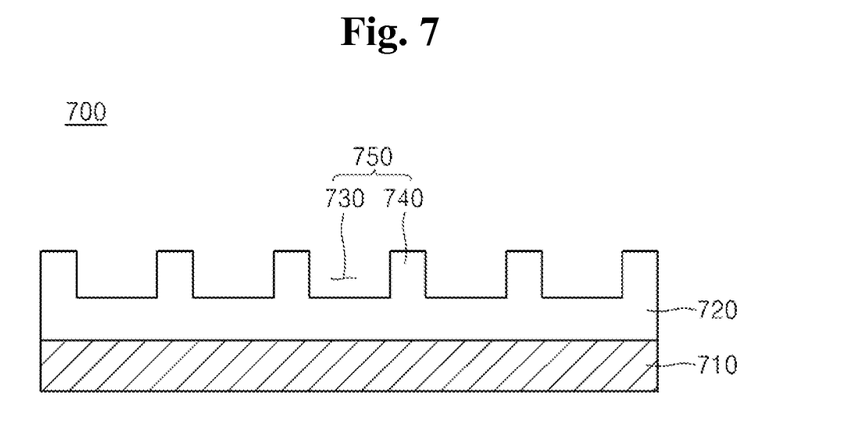
FIG. 7 is a sectional view of a sound absorption type soundproof panel according to one embodiment of the present invention.

FIG. 7 is a sectional view of a sound absorption type soundproof panel according to one embodiment of the present invention.

Referring to FIG. 7, a sound absorbing sheet 720 according to the present invention may be formed on at least one surface of a sound absorber 710, thereby providing a sound absorption type soundproof panel 700.

Here, the sound absorber 710 includes a material which can reduce a coefficient of sound reflection by absorbing sounds incident on a medium, and is not particularly limited. For example, the sound absorber 710 may include at least one selected from among porous plates, organic materials, inorganic materials, natural materials, thermoplastic resin matrices, and thermosetting resin matrices.

The sound absorbing sheet 720 may include a large number of convex-concave patterns 750, which include depressions 730 forming a micro resonant structure on one surface of the porous substrate 720 and protrusions 740 exhibiting porosity. Here, regions corresponding to the depressions 730 and the protrusions 740 may exhibit air permeability. In particular, the region corresponding to the depressions 730 may exhibit lower air permeability than the region corresponding to the protrusions 740, and may exhibit air impermeability in severe cases.

An area ratio of the depressions 730 to the total area of the sound absorbing sheet 720 is 40% or more, preferably 40% to 99%, whereby the sound absorbing sheet 720 satisfies an average coefficient of sound absorption of 0.4 or more in mid and low frequency bands from 200 Hz to 2000 Hz.

For example, an adhesive may be coated onto the sound absorber 710, and one surface of the sound absorbing sheet 720, on which the convex-concave patterns 750 are not formed, is bonded to the sound absorber 710, followed by drying, thereby manufacturing the sound absorption type soundproof panel 700.

The sound absorption type soundproof panel 700 includes the sound absorbing sheet 720 exhibiting improved sound absorption capabilities in the mid and low frequency bands from 200 Hz to 2000 Hz by the micro resonant structure, and thus can exhibit excellent soundproof and sound absorption capabilities in the mid and low frequency bands as set forth above.

The sound absorption type soundproof panel 700 may be used as an interior material of lecture rooms, large conference rooms, karaoke rooms and the like, which are equipped with electrical sound equipment, without being limited thereto.

EXAMPLE

Next, the present invention will be described in more detail with reference to some examples. It should be understood that these examples are provided for illustration only and are not to be construed in any way as limiting the invention.

A description of details apparent to those skilled in the art will be omitted for clarity.

1. Manufacture of Specimen

Example 1

Non-pressed portions (protrusions) were molded in a circular shape through embossed roll molding of PET non-woven fabrics, which were prepared by spunbonding and had a basis weight of 80 g/m², at 220° C., thereby forming a resonant layer in the non-woven fabrics. The circular shapes of the non-pressed portions had a diameter of 1.5 mm and a pitch of 1.9 mm, and an area ratio of pressed portions was 43.5%.

Example 2

A specimen was prepared in the same manner as in Example 1 except that the pitch was 2.3 mm and the area ratio of the pressed portions was 61.4%.

Example 3

A specimen was prepared in the same manner as in Example 1 except that the pitch was 3.3 mm and the area ratio of the pressed portions was 81.3%.

Example 4

A specimen was prepared in the same manner as in Example 1 except that the pitch was 15 mm and the area ratio of the pressed portions was 99%.

Example 5

Non-pressed portions (protrusions) were molded in a square shape through embossed roll molding of PET non-woven fabrics, which were prepared by spunbonding and had a basis weight of 80 g/m², at 220° C., thereby forming a resonant layer in the non-woven fabrics. The square shapes of the non-pressed portions had a length of 1 mm at one side and a pitch of 2.3 mm, and an area ratio of pressed portions was 81.1%.

Example 6

Non-pressed portions (protrusions) were molded in a stripe shape through embossed roll molding of PET non-woven fabrics, which were prepared by spunbonding and had a basis weight of 80 g/m2, at 220° C., thereby forming a resonant layer in the non-woven fabric. The stripe shapes of the non-pressed portions had a width of 1 mm and a pitch of 5.3 mm, and an area ratio of pressed portions was 81.1%.

Comparative Example 1
Sound absorption capabilities of PET non-woven fabrics, which were prepared by spunbonding and had a basis weight of 80 g/m², were evaluated.

Comparative Example 2
A specimen was prepared in the same manner as in Example 1 except that the pitch was 1.8 mm and the area ratio of the pressed portions was 37%.

Comparative Example 3
A specimen was prepared in the same manner as in Example 1 except that the pitch was 20 mm and the area ratio of the pressed portions was 99.5%.

Comparative Example 4
Non-pressed portions (protrusions) were molded in a stripe shape through embossed roll molding of PET non-woven fabrics, which were prepared by spunbonding and had a basis weight of 80 g/m², at 220° C., thereby forming a resonant layer in the non-woven fabric. The stripe shapes of the non-pressed portions had a width of 10 mm and a pitch of 15 mm, and an area ratio of pressed portions was 33.3%.

2. Evaluation of Sound Absorption Capabilities

Each of the specimens of Examples 1 to 6 and Comparative Examples 1 to 4 was evaluated as to sound absorption capabilities. Results are shown in Table 1. These results show sound absorption capabilities when a rear space of the sound absorbing sheets was 50 mm.

TABLE 1

| Frequency (Hz) | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| 200 | 0.1 | 0.1 | 0.1 | 0.1 | 0.13 | 0.06 | 0.02 | 0.02 | 0.1 | 0.02 |
| 250 | 0.1 | 0.12 | 0.2 | 0.2 | 0.14 | 0.15 | 0.05 | 0.05 | 0.2 | 0.05 |
| 315 | 0.2 | 0.22 | 0.47 | 0.45 | 0.33 | 0.42 | 0.06 | 0.06 | 0.46 | 0.09 |
| 400 | 0.28 | 0.3 | 0.71 | 0.72 | 0.75 | 0.66 | 0.11 | 0.11 | 0.73 | 0.14 |
| 500 | 0.35 | 0.37 | 0.9 | 0.92 | 0.91 | 0.89 | 0.18 | 0.2 | 0.89 | 0.2 |

TABLE 1-continued

| Frequency (Hz) | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| 630 | 0.43 | 0.45 | 0.89 | 0.85 | 0.9 | 0.91 | 0.3 | 0.32 | 0.7 | 0.35 |
| 800 | 0.5 | 0.52 | 0.84 | 0.65 | 0.84 | 0.89 | 0.42 | 0.42 | 0.51 | 0.48 |
| 1000 | 0.56 | 0.59 | 0.77 | 0.42 | 0.72 | 0.81 | 0.53 | 0.54 | 0.33 | 0.55 |
| 1250 | 0.62 | 0.65 | 0.72 | 0.23 | 0.65 | 0.75 | 0.63 | 0.64 | 0.18 | 0.65 |
| 1600 | 0.67 | 0.7 | 0.64 | 0.18 | 0.57 | 0.66 | 0.71 | 0.72 | 0.12 | 0.69 |
| 2000 | 0.7 | 0.74 | 0.63 | 0.13 | 0.56 | 0.64 | 0.73 | 0.74 | 0.1 | 0.71 |
| NRC | 0.43 | 0.46 | 0.63 | 0.42 | 0.58 | 0.62 | 0.37 | 0.38 | 0.38 | 0.38 |

Referring to Table 1, the specimens of Examples 1 to 6, which satisfied the conditions according to the present invention, satisfied an average coefficient of sound absorption of 0.4 or more, which was a target value, in a frequency band from 200 Hz to 2000 Hz. On the other hand, the specimens of Comparative Examples 1 to 4, which did not satisfy the conditions according to the present invention, had an average coefficient of sound absorption, which did not reach the target value, in the frequency band from 200 Hz to 2000 Hz.

That is, comparing the specimens of Examples 1 to 6 which satisfied the conditions according to the present invention, with the specimens of Comparative Examples 1 to 4 which did not satisfy the conditions according to the present invention, it could be confirmed that, when a micro resonant structure was formed in the non-woven fabric by thermal pressing, the sound absorbing sheet exhibited significantly improved sound absorption capabilities in mid and low frequency bands from 200 Hz to 2000 Hz.

From observation of optical microscope pictures (magnification of 100×) obtained from the pressed portions and the non-pressed portions of the sound absorbing sheet of Example 1, it could be confirmed that the pressed portions of the sound absorbing sheet of Example 1 were formed by high-temperature compression molding of fibers and thus changed into a structure exhibiting no air permeability. On the other hand, it could be confirmed that the non-pressed portions of the sound absorbing sheet of Example 1 were formed of porous fibers and maintained air permeability.

Although the present invention has been described with reference to some embodiments, it should be understood that the foregoing embodiments are provided for illustration only, and that various modifications, changes, alterations, and equivalent embodiments can be made by those skilled in the art without departing from the spirit and scope of the invention. Therefore, the scope of the invention should be limited only by the accompanying claims and equivalents thereof.

LIST OF REFERENCE NUMERALS

100, 610, 720: Porous substrate
120, 650, 740: Protrusions
130, 640, 730: Depressions
140, 660, 750: Convex-concave patterns
620: Embossed roll
625: Embossing protrusion
630: Cylindrical roll
700: Sound absorption type soundproof panel
710: Sound absorber
720: Sound absorbing sheet
A: First air permeating portion
B: Second air permeating portion
W: Diameter or width of protrusions
P: Pitch

The invention claimed is:

1. A sound absorbing sheet, comprising:
    a plurality of convex-concave patterns comprising protrusions and depressions on one surface of a porous substrate, wherein
    the convex-concave patterns have a pitch of 1.9 mm to 15 mm,
    the sound absorbing sheet has an area ratio of the depressions from 43.5% to 99%, as represented by Equation 1,
    the sound absorbing sheet has an average coefficient of sound absorption of 0.4 or more in a frequency band from 200 Hz to 2000 Hz, and
    a region corresponding to the depressions exhibits lower air permeability than a region corresponding to the protrusions, Area ratio of depressions=[Area of depressions]/[Area of porous substrate].     [Equation 1]

2. The sound absorbing sheet according to claim 1, wherein the protrusions have a width or diameter of 0.2 mm to 20 mm.

3. The sound absorbing sheet according to claim 1, wherein the porous substrate comprises thermoplastic organic fibers.

4. The sound absorbing sheet according to claim 1, wherein the porous substrate comprises thermoplastic organic fibers containing inorganic fibers.

5. The sound absorbing sheet according to claim 4, wherein the thermoplastic organic fibers comprise at least one selected from the group consisting of polyethylene terephthalate, polyethylene, and polypropylene (PP).

6. The sound absorbing sheet according to claim 1, wherein the protrusions have any shape selected from the group consisting of circles, ellipses, polygons, stripes, and combinations thereof.

7. The sound absorbing sheet according to claim 1, wherein the porous substrate has a basis weight of 30 g/m$^2$ to 800 g/m$^2$.

8. The sound absorbing sheet according to claim 1, wherein the porous substrate has a thickness of 0.1 mm to 10 mm.

9. The sound absorbing sheet according to claim 1, wherein the porous substrate has an air permeability of 20 L/m$^2$/s to 1200 L/m$^2$/s at a pressure of 200 Pa.

10. The sound absorbing sheet according to claim 1, wherein the porous substrate has an original air permeability of 20 L/m$^2$/s to 1200 L/m$^2$/s at 100 Pa.

11. A sound absorption type soundproof panel, comprising:
    a sound absorber; and
    the sound absorbing sheet according to claim 1 formed on at least one surface of the sound absorber.

12. The soundproof panel according to claim 11, wherein the sound absorber comprises at least one selected from the group consisting of porous plates, organic materials, inorganic materials, natural materials, thermoplastic resin matrices, and thermosetting resin matrices.

13. The sound absorbing sheet according to claim 4, wherein the thermoplastic organic fibers comprise at least one selected from the group consisting of polyethylene terephthalate, polyethylene, and polypropylene (PP).

14. A method for manufacturing a sound absorbing sheet, comprising:
- preparing a porous substrate; and
- forming a plurality of convex-concave patterns comprising protrusions and depressions on one surface of the porous substrate through thermal transfer, wherein
- the convex-concave patterns have a pitch of 1.9 mm to 15 mm,
- the sound absorbing sheet has an area ratio of the depressions from 43.5% to 99%, as represented by Equation 1, the sound absorbing sheet has an average coefficient of sound absorption of 0.4 or more in a frequency band from 200 Hz to 2000 Hz, $$\text{Area ratio of depressions} = [\text{Area of depressions}]/[\text{Area of porous substrate}], \quad [\text{Equation 1}]$$

and
- said forming the plurality of convex-concave patterns comprises pressing the porous substrate.

15. The method according to claim 14, wherein thermal transfer is performed by embossed roll molding or embossed press molding.

16. The method according to claim 15, wherein said forming the plurality of convex-concave patterns comprises:
- preheating the porous substrate to a temperature of 60% to 100% a melting point thereof; and
- pressing an embossed roll or embossed press onto the preheated porous substrate.

* * * * *